Patented July 5, 1932

1,865,754

UNITED STATES PATENT OFFICE

CARL N. HAND, OF NITRO, WEST VIRGINIA, ASSIGNOR TO ELKO CHEMICAL COMPANY, OF NITRO, WEST VIRGINIA, A CORPORATION OF WEST VIRGINIA

PROCESS FOR THE MANUFACTURE OF ANHYDROUS SODIUM SULPHITE

No Drawing. Application filed March 19, 1928. Serial No. 262,993.

This invention relates to the production of sodium sulphite in a substantially anhydrous form. More particularly the invention relates to the production of an anhydrous salt from hydrates of sodium sulphite and from aqueous solutions thereof.

Heretofore, it has been common practice in preparing anhydrous sodium sulphite from aqueous solutions to separate the hydrated crystalline product by cooling the solution to approximately 0° C. or thereabout, and filtering. The hydrated salt was then dehydrated by allowing it to effloresce at a temperature below its transition point, which is 22° C., or by heating it above its transition point and thus expelling the water of crystallization. The first of these methods is slow, and, owing to the prolonged exposure of the hydrated sodium sulphite to atmospheric oxygen, it is partly converted to sodium sulphate. The second of these two methods is also slow and exceptionally tedious owing to water separating out and caking of the product.

According to the present invention, the hydrated sodium sulphite was separated from an aqueous solution thereof by cooling the solution to approximately 0° C. and separating the hydrated crystals by any of the well known methods, for example, by filtration, centrifuging and the like. The sodium sulphite crystals were then placed in a suitable vessel equipped with means of agitation, for example a glass enameled steam-jacketed kettle fitted with a stirrer, and the crystals were melted in their own water of crystallization, thereby precipitating a large proportion of the sodium sulphite as an anhydrous sludge. When the temperature of the contents of the vessel was raised to approximately 95° to 100° C., the sludge became sandy and filtered readily. The precipitate was then separated while hot, preferably at a temperature of approximately between 75° to 100° C., from the mother liquor by any of the well known methods, for example by dropping on to a vacuum filter tube, where the anhydrous material was sucked as dry as possible and the mother liquor, consisting of a supersaturated solution of sodium sulphite was returned to the tank feeding the sulphite crystallizers. The hot, wet anhydrous precipitate was then dried in any convenient manner, for example by feeding directly from the vacuum filter into a dryer consisting of a horizontal tube set in a gas-fired furnace equipped with a stirrer, spiral agitator or the like, to prevent local overheating, where it was heated to a temperature above 100° C. and preferably approximately between 150° and 200° C., accompanied by agitation. The hot dry anhydrous material was then passed without grinding through a 50-mesh rotary screen. The anhydrous sodium sulphite thus obtained is practically 100% pure and does not require further purification.

The example set forth is illustrative only and not at all limitative of the invention. For example, other temperatures than those specified may be used or other means of separating and drying the product than those indicated may be employed. The invention is limited solely by the claims attached hereto as a part of this specification, wherein it is intended to claim the invention as broadly as possible in view of the prior art.

What is claimed is:

1. In the process for the manufacture of anhydrous sodium sulphite, the steps comprising in combination melting crystalline hydrated sodium sulphite, substantially free from other salts or solvent, in its own water of crystallization, heating the molten mass so obtained to approximately between 95° and 100° C., separating the precipitated anhydrous salt so formed at a temperature of approximately between 75° and 100° C., and drying the anhydrous sodium sulphite.

2. In the process for the manufacture of anhydrous sodium sulphite, the steps comprising in combination melting crystalline hydrated sodium sulphite, substantially free from other salts, in its own water of crystallization, heating the molten mass so obtained to approximately between 95° and 100° C., separating the precipitated anhydrous salt so formed at a temperature of approximately between 75° and 100° C., and drying it at a temperature of approximately between 150° and 200° C.

In testimony whereof I hereunto affix my signature.

CARL N. HAND.